123,851

UNITED STATES PATENT OFFICE.

A. QUARLES WITHERS, OF HOLLY SPRINGS, MISSISSIPPI.

IMPROVEMENT IN PRESERVE-JARS.

Specification forming part of Letters Patent No. 123,851, dated February 20, 1872.

*To all whom it may concern:*

Be it known that I, A. QUARLES WITHERS, of Holly Springs, in the county of Marshall, and State of Mississippi, have invented an Improved Glass Fruit and Preserve Jar; and I do hereby declare that the following is a full and exact description thereof.

The nature of my invention consists in making fruit and preserve jars of such colors of glass as will exclude or transmit the fewest of the chemical actinic rays of light, for the purpose of preventing any fermentation of the fruit or other substances to be preserved inside, which all are more or less liable to, even with the most perfect exclusion of atmospheric air or oxygen from the jars.

The colors most perfectly fulfilling this purpose are yellow, orange, and red; and I prefer to use either one or all of them, though approximate colors, such as the yellowish-green, may be used with better effect than white glass; but bluish-green glass is unsuitable, being nearly as bad for the purpose as blue itself. To produce the colors required any metallic oxides or other substances which are suitable, may be employed.

What I claim as my invention, and desire to secure by Letters Patent, is—

Fruit and preserve-jars made of yellow, red, or other colors of glass having little chemical or actinic effect on the substances exposed to the light transmitted through the glass, as a new article of manufacture.

A. QUARLES WITHERS.

Witnesses:
W. H. VICK,
S. W. BONNER.